US012646406B2

(12) United States Patent
Wijesekera et al.

(10) Patent No.: US 12,646,406 B2
(45) Date of Patent: Jun. 2, 2026

(54) COUNTERING AUTONOMOUS VEHICLE USAGE FOR RAMMING ATTACKS

(71) Applicant: George Mason University, Fairfax, VA (US)

(72) Inventors: Duminda Wijesekera, Fairfax, VA (US); Santos Jha, Fairfax, VA (US); Cing-Dao Kan, Fairfax, VA (US); Zoran Duric, Fairfax, VA (US); Fernando Camelli, Fairfax, VA (US)

(73) Assignee: George Mason University, Fairfax, VA (US)

( * ) Notice: Subject to any disclaimer, the term of this patent is extended or adjusted under 35 U.S.C. 154(b) by 245 days.

(21) Appl. No.: 18/157,586

(22) Filed: Jan. 20, 2023

(65) Prior Publication Data

US 2023/0234615 A1 Jul. 27, 2023

Related U.S. Application Data

(60) Provisional application No. 63/301,591, filed on Jan. 21, 2022.

(51) Int. Cl.
*G08G 1/01* (2006.01)
*G08G 1/056* (2006.01)

(52) U.S. Cl.
CPC ......... *G08G 1/0112* (2013.01); *G08G 1/0116* (2013.01); *G08G 1/0129* (2013.01);
(Continued)

(58) Field of Classification Search
CPC ....... B60W 60/00188; B60W 60/0017; B60W 2556/45; B60W 2554/4046; H04W 4/40
See application file for complete search history.

(56) References Cited

U.S. PATENT DOCUMENTS

2021/0157330 A1* 5/2021 Tran ........................ G06V 10/82
2021/0223051 A1* 7/2021 Hochberg .......... G01C 21/3492
(Continued)

FOREIGN PATENT DOCUMENTS

DE 10141695 A1 * 3/2003 ......... G01C 21/3415
EP 3945394 A1 * 2/2022 .............. H04W 4/33

OTHER PUBLICATIONS

Mohammed Shamim Kaiser, Advances in Crowd Analysis for Urban Applications Through Urban Event Detection, Oct. 2018 (Year: 2018).*

*Primary Examiner* — Erin D Bishop
*Assistant Examiner* — Shivam Sharma
(74) *Attorney, Agent, or Firm* — Bradley Arant Boult Cummings LLP; Daniel E. Sineway, Esq.

(57) ABSTRACT

Systems and methods for countering the usage of autonomous or semi-autonomous vehicles for ramming attacks on a roadway are disclosed. Digital representations of physical trajectories (e.g., roadway travel routes) across which vehicles are expected or permitted to travel are generated based at least on travel-related data (e.g., sensor readings) received from the vehicles over wireless networks. The disclosed systems and methods further generate digital representations of physical trajectories across which vehicles are not permitted to travel, such that the impermissible physical trajectories constitute a deviation from a safe travel route. Additional travel-related data is continuously received from the vehicles in real-time, and the additional data may be combined with non-vehicle data (e.g., pedestrian travel data) and compared to the generated digital representations of permissible and impermissible physical trajectories to determine if the vehicles' physical trajectory is indicative of a harmful impermissible physical trajectory, such as a vehicular ramming attack.

20 Claims, 3 Drawing Sheets

(52) U.S. Cl.
CPC ......... *G08G 1/0133* (2013.01); *G08G 1/0141* (2013.01); *G08G 1/056* (2013.01)

(56) References Cited

U.S. PATENT DOCUMENTS

| | | | | |
|---|---|---|---|---|
| 2021/0312725 | A1* | 10/2021 | Milton | G07C 5/008 |
| 2022/0018906 | A1* | 1/2022 | Brown | G08G 1/0125 |

* cited by examiner

COUNTERING AUTONOMOUS VEHICLE USAGE FOR RAMMING ATTACKS

CROSS REFERENCE TO RELATED APPLICATIONS

This application is a Non-Provisional patent Application of, and claims the benefit of and priority to, U.S. Provisional Patent Application No. 63/301,591, filed on Jan. 21, 2022, and entitled "COUNTERING AUTONOMOUS VEHICLES USAGE FOR RAMMING ATTACKS," the disclosure of which is incorporated by reference as if the same were set forth herein in its entirety.

TECHNICAL FIELD

The present disclosure relates generally to autonomous and semi-autonomous vehicle telematics, and more particularly to detecting, identifying, and/or preventing malicious autonomous and semi-autonomous vehicle ramming attacks.

BACKGROUND

Vehicular ramming attacks continue to be problematic in modern societies. Advancements in telematics and the growing number of computers and sensors manufactured into vehicles has resulted in an increase in collecting and processing of vehicle data. Thus, vehicular behaviors are becoming increasingly trackable and predictable. Furthermore, while ramming attacks (attacks where vehicles are used as an instrument to commit an offense) are typically committed by human drivers, the adoption of autonomous and semi-autonomous vehicles introduces the problem of malicious remote vehicle takeovers for committing these types of ramming attacks. Therefore, there exists a long felt and unresolved need for countering autonomous and semi-autonomous vehicle usage for ramming attacks.

BRIEF SUMMARY OF DISCLOSURE

Aspects of the disclosed systems and methods relate generally to detecting vehicular ramming attacks, and more specifically to detecting vehicular ramming attacks by generating trajectories for vehicles and identifying abnormalities in vehicle trajectories indicative of ramming attacks. In response to detecting a ramming attack associated with a particular vehicle, the disclosed systems and methods may automatically generate alerts and notifications including metadata from the particular vehicle's state and travel trajectory, and furthermore transmit those alerts and notifications to appropriate organizations (e.g., law enforcement, hospitals, emergency services, etc.), thus reducing waiting periods for initiating a response to the attack (e.g., deploying ambulances and/or firetrucks, alerting hospitals of an impending surge in emergency patients, notifying law enforcement, and other appropriate emergency responses).

In various embodiments, the autonomous and semi-autonomous vehicle technology discussed herein uses enhanced control systems to navigate a vehicle along a roadway by creating a trajectory based on that roadway's surrounding environment (e.g., an obstacle-free, legally permissible space). In various embodiments, this trajectory may be updated continuously or periodically (e.g., during each control cycle) based on various system input parameters, such as: (1) data from the vehicle's internal state (e.g., throttle, gear, break position, steering angle, slip/slide estimate, etc.), (2) sensory information fused from color and infrared camera (or other types of cameras), LiDAR, RADAR and sonar sensors (or other appropriate sensors), (3) BSM transmissions received from other/nearby vehicles, CPM transmissions, CAM transmissions, and SPaT (Signal, Phase and Timing—Traffic Signal Information). Accordingly, and in at least one embodiment, these vehicles may generate (and continuously update) trajectories along which they intend to travel, and the vehicles may furthermore emit/broadcast BSM's including some or all of the information corresponding to their trajectories at a frequency of about 10 Hz (or another appropriate frequency). In particular embodiments, the generated trajectories, or metadata corresponding to the generated trajectories, may be included in the BSM transmissions. In certain embodiments, the system may receive BSM transmissions from vehicles on a roadway and furthermore generate predicted trajectories for the vehicles based on the information and metadata included in the received BSM transmissions.

In particular embodiments, the present systems and methods leverage observable/transmitted/published vehicular dynamics and derivable information about vehicles including the values and higher-order derivatives of: (1) acceleration/de-acceleration, (2) steering management, and (3) yaw, roll and pitch sensor readings. According to various aspects of the present disclosure, the systems and methods further use these attributes to determine/infer a normal, abnormal, and potential ramming behavior of a vehicle on a particular roadway and given that roadway's geometry, elevation, super elevation, etc., using generative adversarial deep neural networks (and other machine learning techniques) to distinguish between these ramming behaviors (offline and/or online) and furthermore create a fast pattern matcher for real-time ramming attack detection. Moreover, the disclosed systems and methods allow for providing ramming detection as a service over 5G-MEC (or a similar network) to generate ramming alerts directed towards one or more interested parties (e.g., law enforcement, 911 operators, people near the path of a potential ramming, etc.).

Accordingly, embodiments of the present disclosure aim to detect, identify, and/or prevent vehicle ramming attacks by implementing (at least) an anomaly detection system and method based on externally observable characteristics relating to (or directly broadcasted from) one or more vehicles, and furthermore mounting/loading anomaly detection models onto one or more mobile-edge servers for processing. In certain embodiments, mounting and processing the anomaly detection models on a mobile-edge server, or any appropriate edge computing device, increases anomaly detection efficiency by at least reducing transmission latencies as a result of the edge computing devices' proximity to the detected anomalies (rather than transmitting data to a remote server for processing). In various embodiments, anomaly detection is developed by a series of steps including (but not limited to): 1) creating a preidentified set of observable vehicle attributes (e.g., BSM parameters); 2) creating a preidentified set of observable attributes from CAM and CPM (for radio-less vehicles); 3) developing normal vehicular behavior profiles, as well as abnormal ramming profiles, using machine learning techniques such as generative adversarial deep neural networks; 4) developing fast matching algorithms to match abnormal ramming profiles with real-time vehicle behavior profiles as observed on 5G-MEC networks via receiving broadcasted BSM's; 5) developing in-lab, in-simulation and in-lab experimental test-beds, hypothesis, test criteria and measures of success/failure criteria and repeat if necessary (an optional step, but useful for system initial development and subsequent refinement);

and 6) preparing reports, demonstrations and publications on regular intervals (an optional step). Accordingly, the present disclosure discusses systems and methods that identify, collect, and process data transmissions from vehicles and other objects on, or associated with, a roadway (for example, BSM's, CAM's, CPM's, SPaT messages, etc.). The systems and methods furthermore generate vehicular behavior profiles indicative of the vehicles' current and predicted travel trajectories, as well as hypothetical profiles indicative of potential ramming behaviors for the vehicles. In various embodiments, data from the vehicles is continuously detected and collected via 5G-MEC network observations (or other similar network environments) and subsequently processed to refine/update the vehicular behavior profiles indicative of the vehicle's current and predicted travel trajectories, as well as the ramming profiles. According to various aspects of the present disclosure, processing vehicle data includes identifying particular vehicle attributes within the data (which may be preidentified based on the data type, the structure of its corresponding data packets/frames, and the relative locations of each data element within the packet/frame), comparing the attributes to ramming profile attributes, and furthermore determining if one or more vehicles are executing a ramming attack if the attributes match with an abnormal or impermissible ramming profile.

In one embodiment, the present disclosure discusses a method including the steps of: receiving, at a wireless network edge computing device including a processor and memory, a first transport data message broadcasted in real-time from a controller device at a vehicle traveling on a roadway, wherein the first transport data message includes data elements corresponding to a first transport state of the vehicle; processing preidentified data elements from the first transport data message, the preidentified data elements including measurements corresponding to the first transport state of the vehicle, wherein processing the preidentified data elements includes determining the vehicle's geographical location and generating a first vehicular behavior profile indicative of the vehicle's expected trajectory; in response to determining the vehicle's geographical location, comparing the vehicle's geographical location to roadway location and geometry data stored in the memory to determine the roadway on which the vehicle is traveling and the roadway's physical geometric characteristics; generating, via a trained data model running at the processor, a plurality of hypothetical vehicular behavior profiles wherein each of the plurality of hypothetical vehicular behavior profiles corresponds to permissible or impermissible potential travel trajectories based on potential future variations of the first vehicular behavior profile with respect to the roadway on which the vehicle is traveling and the roadway's physical geometric characteristics; receiving a second transport data message broadcasted in real-time from the controller device at the vehicle traveling on the roadway, wherein the second transport data message is broadcasted at a moment in time later than the first transport data message and includes updated data elements corresponding to a second transport state of the vehicle; processing updated preidentified data elements from the second transport data message, wherein processing the updated preidentified data elements includes generating a second vehicular behavior profile indicative of an updated expected vehicle trajectory; comparing the second vehicular behavior profile to the plurality of hypothetical vehicular behavior profiles to determine if the second vehicular behavior profile matches at least one impermissible potential travel trajectory; and in response to determining a match between the second vehicular behavior profile and at least one impermissible potential travel trajectory, executing one or more predetermined actions based on the match.

In various embodiment, the at least one impermissible potential travel trajectory includes a variation in at least one of the vehicle measurements including speed, heading, steering wheel angle, acceleration, or yaw rate from the first vehicular behavior profile, and wherein the variation results in a hypothetical vehicular behavior profile representative of the updated expected vehicle trajectory exceeding a boundary of the roadway based on the roadway location and geometry data. In at least one embodiment, the match between the second vehicular behavior profile and the at least one impermissible potential travel trajectory is indicative of the vehicle engaging in vehicular ramming behavior. Moreover, in particular embodiments, executing the one or more predetermined actions based on the match includes generating a notification corresponding to the match and transmitting the notification to the one or more third-party systems according to 5G-MEC network standards.

In various embodiments, the one or more third-party systems include systems associated with law enforcement and emergency response services. Further, in various embodiments, the trained data model generates the plurality of hypothetical vehicular behavior profiles based in part on third-party data including publicly available event calendars. In particular embodiments, the vehicle is an autonomous or semi-autonomous vehicle, and the second transport data message is broadcasted in response to the controller device completing at least one control cycle after broadcasting the first transport data message.

In one embodiment, the present disclosure discusses a system including: a wireless network edge computing device including a processor and memory, wherein the processor is operatively configured to execute the steps including: receiving, at the processor, a first transport data message broadcasted in real-time from a controller device at a vehicle traveling on a roadway, wherein the first transport data message includes data elements corresponding to a first transport state of the vehicle; processing preidentified data elements from the first transport data message, the preidentified data elements including measurements corresponding to the first transport state of the vehicle, wherein processing the preidentified data elements includes determining the vehicle's geographical location and generating a first vehicular behavior profile indicative of the vehicle's expected trajectory; in response to determining the vehicle's geographical location, comparing the vehicle's geographical location to roadway location and geometry data stored in the memory to determine the roadway on which the vehicle is traveling and the roadway's physical geometric characteristics; generating, via a trained data model running at the processor, a plurality of hypothetical vehicular behavior profiles wherein each of the plurality of hypothetical vehicular behavior profiles corresponds to permissible or impermissible potential travel trajectories based on potential future variations of the first vehicular behavior profile with respect to the roadway on which the vehicle is traveling and the roadway's physical geometric characteristics; receiving a second transport data message broadcasted in real-time from the controller device at the vehicle traveling on the roadway, wherein the second transport data message is broadcasted at a moment in time later than the first transport data message and includes updated data elements corresponding to a second transport state of the vehicle; processing updated preidentified data elements from the second transport data message, wherein processing the updated preidentified data elements includes generating a second vehicular behavior profile indicative of an updated expected vehicle trajectory; comparing the second vehicular behavior profile to the plurality of hypothetical vehicular behavior profiles to determine if the second vehicular behavior profile matches at least one impermissible potential travel trajectory; and in response to determining a match between the second vehicular behavior profile and at least one impermissible potential travel trajectory, executing one or more predetermined actions based on the match.

In particular embodiments, the at least one impermissible potential travel trajectory includes a variation in at least one of the vehicle measurements including speed, heading, steering wheel angle, acceleration, or yaw rate from the first vehicular behavior profile, and wherein the variation results in a hypothetical vehicular behavior profile representative of the updated expected vehicle trajectory exceeding a boundary of the roadway based on the roadway location and geometry data. In various embodiments, the match between the second vehicular behavior profile and the at least one impermissible potential travel trajectory is indicative of the vehicle engaging in vehicular ramming behavior. Further, in at least one embodiment, executing the one or more predetermined actions based on the match includes generating a notification corresponding to the match and transmitting the notification to the one or more third-party systems according to 5G-MEC network standards, and the one or more third-party systems include systems associated with law enforcement and emergency response services.

According to various aspects of the present disclosure, the trained data model generates the plurality of hypothetical vehicular behavior profiles based in part on third-party data including publicly available event calendars. In particular embodiments, the vehicle is an autonomous or semi-autonomous vehicle, and the second transport data message is broadcasted in response to the controller device completing at least one control cycle after broadcasting the first transport data message.

In at least one embodiment, the present disclosure discusses a tangible, non-transitory, computer-readable medium including instructions encoded therein, wherein the instructions, when executed by one or more processors, cause the one or more processors to execute the steps including: receiving, at a wireless network edge computing device including the one or more processors and a memory, a first transport data message broadcasted in real-time from a controller device at a vehicle traveling on a roadway, wherein the first transport data message includes data elements corresponding to a first transport state of the vehicle; processing preidentified data elements from the first transport data message, the preidentified data elements including measurements corresponding to the first transport state of the vehicle, wherein processing the preidentified data elements includes determining the vehicle's geographical location and generating a first vehicular behavior profile indicative of the vehicle's expected trajectory; in response to determining the vehicle's geographical location, comparing the vehicle's geographical location to roadway location and geometry data stored in the memory to determine the roadway on which the vehicle is traveling and the roadway's physical geometric characteristics; generating, via a trained data model running at the one or more processors, a plurality of hypothetical vehicular behavior profiles wherein each of the plurality of vehicular behavior profiles corresponds to permissible or impermissible potential travel trajectories based on potential future variations of the first vehicular behavior profile with respect to the roadway on which the vehicle is traveling and the roadway's physical geometric characteristics; receiving a second transport data message broadcasted in real-time from the controller device at the vehicle traveling on the roadway, wherein the second transport data message is broadcasted at a moment in time later than the first transport data message and includes updated data elements corresponding to a second transport state of the vehicle; processing updated preidentified data elements from the second transport data message, wherein processing the updated preidentified data elements includes generating a second vehicular behavior profile indicative of an updated expected vehicle trajectory; comparing the second vehicular behavior profile to the plurality of hypothetical vehicular behavior profiles to determine if the second vehicular behavior profile matches at least one impermissible potential travel trajectory; and in response to determining a match between the second vehicular behavior profile and at least one impermissible potential travel trajectory, executing one or more predetermined actions based on the match.

In various embodiments, the at least one impermissible potential travel trajectory includes a variation in at least one of the vehicle measurements including speed, heading, steering wheel angle, acceleration, or yaw rate from the first vehicular behavior profile, and wherein the variation results in a hypothetical vehicular behavior profile representative of the updated expected vehicle trajectory exceeding a boundary of the roadway based on the roadway location and geometry data.

In particular embodiments, the match between the second vehicular behavior profile and the at least one impermissible potential travel trajectory is indicative of the vehicle engaging in vehicular ramming behavior. According to various aspects of the present disclosure, executing the one or more predetermined actions based on the match includes generating a notification corresponding to the match and transmitting the notification to the one or more third-party systems according to 5G-MEC network standards, and wherein the one or more third-party systems include systems associated with law enforcement and emergency response services.

These and other aspects, features, and benefits of the disclosed technology will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DEFINITIONS

Figure 1:
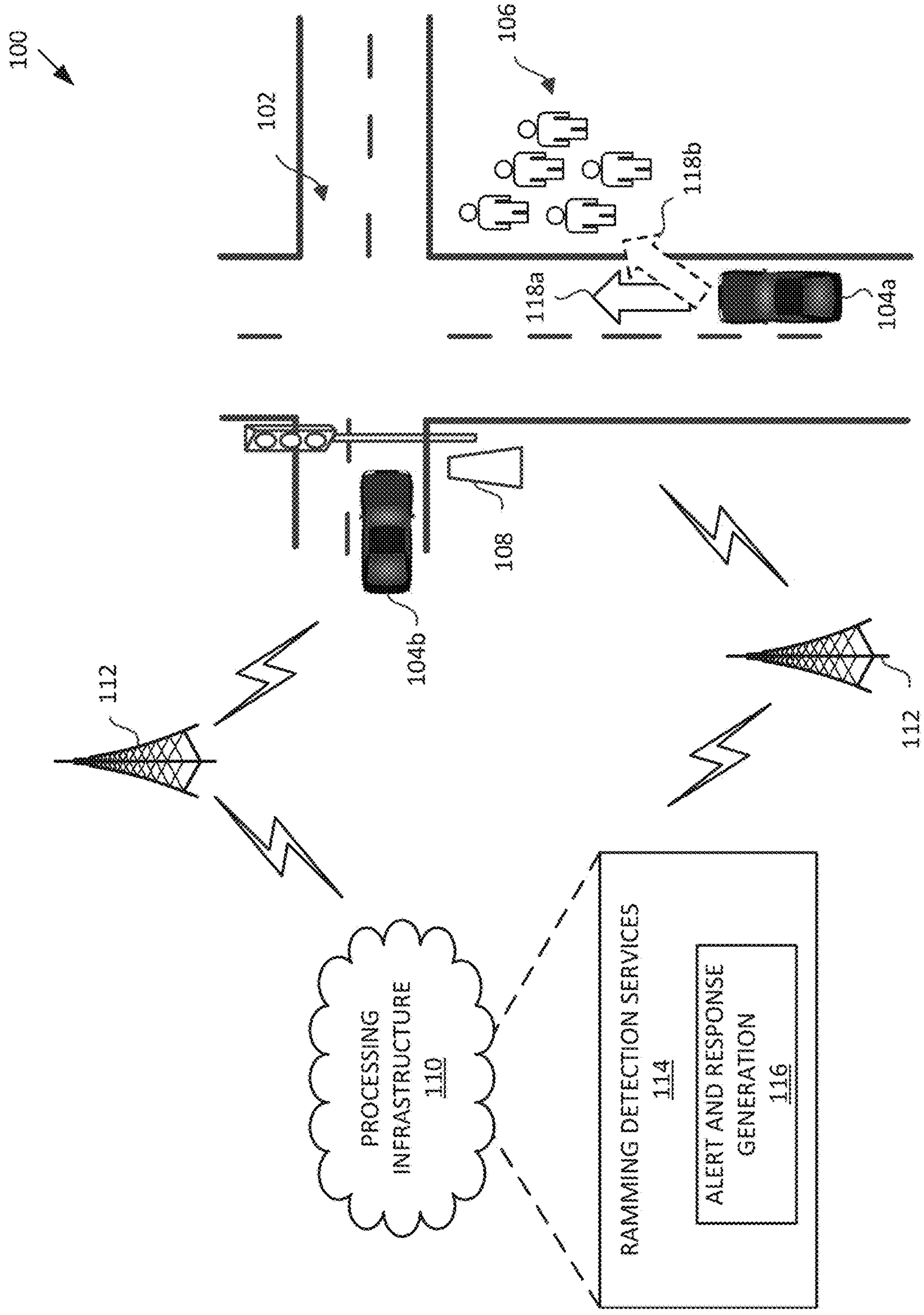
FIG. 1 is an exemplary operational environment, according to one embodiment of the present disclosure.

Prior to a description of the disclosure, the following definitions are provided as an aid to understanding the subject matter and terminology of aspects of the present systems and methods, are exemplary, and not necessarily limiting of the aspects of the systems and methods, which are expressed in the claims. Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

1. Basic Safety Message (BSM): A data packet or message containing information about a vehicle's position, heading, speed, and other information relating to a vehicle's state and path of travel. BSM messages may be broadcasted in accordance with SAE J2735 standards, which further conforms to standards such as IEEE 802.11 and IEEE 1609 which relate to Dedicated Short Range Communications for Wireless Access in Vehicular Environments (DSRC/WAVE, or simply "DSRC").
2. Cellular Vehicle-to-Everything (C-V2X): a connectivity platform providing vehicles with low-latency vehicle-to-vehicle, vehicle-to-roadside infrastructure, and vehicle-to-pedestrian communications.
3. Corporate Awareness Message (CAM): A data packet or message transmitted by roadway infrastructure devices containing information about objects not equipped to transmit their own messages.
4. Corporate Perception Message (CPM): A data packet or message transmitted by a vehicle and containing information relating to obstacles observed by the vehicle, where the observed obstacles are not equipped to transmit their own messages.
5. MAP Message: A data object generally corresponding to a roadway's geometry, typically including a number of lanes, lane types, lane boundaries, corresponding location data, etc.
6. Open Radio Access Network (O-RAN): An interconnection standard for facilitating the interoperability and standardization of radio access network components and equipment, allowing for equipment and software from different vendors to communicate.
7. Signal, Phase, and Timing (SPaT) Message: A data object generally transmitted by traffic controlling hardware representative of the signal controller state.
8. Ultra-Reliable Low-Latency Communication (URLLC): A 5G New Radio supported communication method optimized for processing large amounts of data with minimal or low delay.
9. 5G-Multi-Access Edge Computing (5G-MEC): A wireless network solution providing computing services to nodes at a network's fringe, or edge, supported by the fifth-generation mobile network (5G).

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

The present systems and methods relate generally to countering autonomous vehicle usage for ramming attacks, and more specifically to detecting vehicular ramming attacks by generating trajectories for vehicles and identifying abnormalities in vehicle trajectories indicative of ramming attacks. In response to detecting a ramming attack associated with a particular vehicle, the disclosed systems and methods may automatically generate alerts and notifications including metadata from the particular vehicle's state and travel trajectory, and furthermore transmit those alerts and notifications to appropriate organizations (e.g., law enforcement, hospitals, emergency services, etc.), thus reducing waiting periods for initiating a response to the attack (e.g., deploying ambulances and/or firetrucks, alerting hospitals of an impending surge in emergency patients, notifying law enforcement, and other appropriate emergency responses).

In various embodiments, the autonomous and semi-autonomous vehicle technology discussed herein uses enhanced control systems to navigate a vehicle along a roadway by creating a trajectory based on that roadway's surrounding environment (e.g., an obstacle-free, legally permissible space). In various embodiments, this trajectory may be updated continuously or periodically (e.g., during each control cycle) based on various system input parameters, such as: (1) data from the vehicle's internal state (e.g., throttle, gear, break position, steering angle, slip/slide estimate, etc.), (2) sensory information fused from color and infrared camera (or other types of cameras), LiDAR, RADAR and sonar sensors (or other appropriate sensors), (3) BSM transmissions received from other/nearby vehicles, CPM transmissions, CAM transmissions, and SPaT (Signal, Phase and Timing—Traffic Signal Information). Accordingly, and in at least one embodiment, these vehicles may generate (and continuously update) trajectories along which they intend to travel, and the vehicles may furthermore emit/broadcast BSM's including some or all of the information corresponding to their trajectories at a frequency of about 10 Hz (or another appropriate frequency). In particular embodiments, the generated trajectories, or metadata corresponding to the generated trajectories, may be included in the BSM transmissions. In certain embodiments, the system may receive BSM transmissions from vehicles on a roadway and furthermore generate predicted trajectories for the vehicles based on the information and metadata included in the received BSM transmissions.

In particular embodiments, the present systems and methods leverage observable/transmitted/published vehicular dynamics and derivable information about vehicles including the values and higher-order derivatives of: (1) acceleration/de-acceleration, (2) steering management, and (3) yaw, roll and pitch sensor readings. According to various aspects of the present disclosure, the systems and methods further use these attributes to determine/infer a normal, abnormal, and potential ramming behavior of a vehicle on a particular roadway and given that roadway's geometry, elevation, super elevation, etc., using generative adversarial deep neural networks (and other machine learning techniques) to distinguish between these ramming behaviors (offline and/or online) and furthermore create a fast pattern matcher for real-time ramming attack detection. Moreover, the disclosed systems and methods allow for providing ramming detection as a service over 5G-MEC (or a similar network) to generate ramming alerts directed towards one or more interested parties (e.g., law enforcement, 911 operators, people near the path of a potential ramming, etc.).

Accordingly, embodiments of the present disclosure aim to detect, identify, and/or prevent vehicle ramming attacks by implementing (at least) an anomaly detection system and method based on externally observable characteristics relating to (or directly broadcasted from) one or more vehicles, and furthermore mounting/loading anomaly detection models onto one or more mobile-edge servers for processing. In certain embodiments, mounting and processing the anomaly detection models on a mobile-edge server, or any appropriate edge computing device, increases anomaly detection efficiency by at least reducing transmission latencies as a result of the edge computing devices' proximity to the detected anomalies (rather than transmitting data to a remote server for processing). In various embodiments, anomaly detection is developed by a series of steps including (but not limited to): 1) creating a preidentified set of observable vehicle attributes (e.g., BSM parameters); 2) creating a preidentified set of observable attributes from CAM and CPM (for radio-less vehicles); 3) developing normal vehicular behavior profiles, as well as abnormal ramming profiles, using machine learning techniques such as generative adversarial deep neural networks; 4) developing fast matching algorithms to match abnormal ramming profiles with real-time vehicle behavior profiles as observed on 5G-MEC networks via receiving broadcasted BSM's; 5) developing in-lab, in-simulation and in-lab experimental test-beds, hypothesis, test criteria and measures of success/failure criteria and repeat if necessary (an optional step, but useful for system initial development and subsequent refinement); and 6) preparing reports, demonstrations and publications on regular intervals (an optional step). Accordingly, the present disclosure discusses systems and methods that identify, collect, and process data transmissions from vehicles and other objects on, or associated with, a roadway (for example, BSM's, CAM's, CPM's, SPaT messages, etc.). The systems and methods furthermore generate vehicular behavior profiles indicative of the vehicles' current and predicted travel trajectories, as well as hypothetical profiles indicative of potential ramming behaviors for the vehicles. In various embodiments, data from the vehicles is continuously detected and collected via 5G-MEC network observations (or other similar network environments) and subsequently processed to refine/update the vehicular behavior profiles indicative of the vehicle's current and predicted travel trajectories, as well as the ramming profiles. According to various aspects of the present disclosure, processing vehicle data includes identifying particular vehicle attributes within the data (which may be preidentified based on the data type, the structure of its corresponding data packets/frames, and the relative locations of each data element within the packet/frame), comparing the attributes to ramming profile attributes, and furthermore determining if one or more vehicles are executing a ramming attack if the attributes match with an abnormal or impermissible ramming profile.

Referring now to the drawings, FIG. 1 is an exemplary operational environment 100, according to one embodiment of the present disclosure. In various embodiments, the exemplary operational environment 100 includes a roadway 102 with one or more vehicles 104 (each individually labeled as 104*a*, 104*b* . . . 104*n*, in the present embodiment) traveling on the roadway 102. In certain embodiments, the one or more vehicles 104 may include autonomous vehicles, human-operated vehicles, or a combination of both. In at least one embodiment, aspects of the present disclosure aim to prevent, mitigate, and/or respond to vehicular ramming attacks, such as ramming attacks against a pedestrian or group of pedestrians 106.

According to various aspects of the present disclosure, the system may identify, collect, and process data from various sources including the one or more vehicles 104, as well as data from roadside hardware (and associated software) such as traffic controlling units 108, to generate vehicular behavior profiles indicative of predicted travel trajectories (also referred to herein simply as "trajectories") corresponding to the one or more vehicles 104. In one embodiment, the generated trajectories represent expected and/or permissible paths on the roadway 102 along which the one or more vehicles 104 may travel.

In various embodiments, the system includes a processing infrastructure 110, which may be a cloud-based computing environment including remote servers, processors, and similarly appropriate computing resources for processing the vehicle data and generating/executing the algorithms by which ramming attacks are detected. In certain embodiments, the processing executed at the processing infrastructure 110, or at least a portion of the processing, may also be executed at one or more mobile-edge servers or edge computing devices more local in physical proximity to the vehicles (e.g., smart phones as edge devices, edge devices integrated into cellular towers, etc.). In various embodiments, the wireless data communications discussed herein may be facilitated by a network backbone such as a 5G, 4G-LTE, UMTS, GSM, etc., network implementing a 3GPP protocol (or the like). However, the data communications discussed herein may also be facilitated by other network types such as WiFi, Bluetooth, radio frequency communications (RF), near field communications (NFC), mesh networks, C-V2X-supporting networks, etc. While it should not be considered as limiting, the wireless communications and their supporting networks discussed herein are represented in the present embodiment (and referred to hereinafter) as the network 112. In various embodiments, and as will be discussed in greater detail below in association with the description of FIG. 2, the processing infrastructure 110 may include various supporting systems (such as ramming detection services 114) and further supporting subsystems (such as the alert and response generation system 116), for ultimately determining if a vehicle's behavior indicates a ramming attack.

In particular embodiments, and as shown in the present embodiment, a trajectory 118*a* corresponds to an expected and permissible path for the vehicle 104*a*. Particularly, the trajectory 118*a* is a computer-generated digital representation of a predicted location and speed (generally a predicted travel profile at a point in time in the immediate near future) for the vehicle 104*a* based on real-time data (as well as historical and stored data) such as speed, heading, orientation readings from an accelerometer or similar sensor at the vehicle 104*a* (e.g., yaw, pitch, roll, etc.), nearby traffic intersection data such as traffic light states (SPaT data transmissions) and roadway/intersection geometries (MAP data transmissions), machine learning predictions extrapolated from that data (and other data), and other relevant metadata. In certain embodiments, the trajectory 118*a* is generated by an on-board computing system at the vehicle 104*a*, and attributes corresponding to the trajectory 118*a* may be included in BSMs transmitted/broadcasted by the vehicle 104*a*. In response to receiving a broadcasted BSM, the system disclosed herein may generate a vehicular behavior profile based on the information included in the BSM, wherein the vehicular behavior profile is indicative of the vehicle 104*a*'s predicted trajectory. In various embodiments, the system may continuously receive BSM's broadcasted from the vehicle 104*a*, and the system may continuously check for abnormalities in updated vehicular behavior profiles and generated trajectories, as detected abnormalities may indicate imminent and/or presently occurring vehicular ramming attacks.

Still referring to FIG. 1, the present embodiment illustrates an abnormal trajectory 118*b* representative of a potential or presently occurring vehicular ramming attack where the vehicle 104*a* is traveling towards the crowd 106. While various factors and parameters are considered for determining if a vehicle's trajectory indicates a ramming attack, consider as an example that the vehicle 104*a* was traveling along the roadway 102 in accordance with permissible and expected driving behaviors while a sudden change in its acceleration and/or heading was identified by an on-board sensor or hardware in a driver/passenger's mobile phone (e.g., an accelerometer). Furthermore, this new acceleration and heading data is included in a subsequent BSM transmission and is detected/received by an edge-server device (e.g., the processing infrastructure). In various embodiments, the system may process the change in acceleration and heading data (e.g., via the ramming detection services 114) and furthermore compare the data to ramming profiles for determining if the change in acceleration and heading data matches with known ramming attack attributes. If it is determined that the vehicle is indeed involved in a ramming attack against the crowd 106, the system may initiate an emergency response message via the alert and response generation subsystem 116. According to various aspects of the present disclosure, the system may generate and transmit emergency response messages using a URLLC and O-RAN supported implementation.

In various embodiments, and continuing with this example, the system may compare acceleration and heading data (and other data) to real-time and historical traffic data. For example, in determining if the vehicle's 104*a* behavior is an abnormal trajectory 118*b* indicative of a ramming attack, the system may query an event calendar to determine if any known events (and thus nearby and large crowds of people) correspond to the current location of the vehicle 104*a*, as well as the current date/time. In particular embodiments, and prior to declaring that the abnormal trajectory 118*b* is in fact a ramming attack, the system may further determine if the sudden change in acceleration and heading was corrected within a predetermined time threshold (e.g., within 5 s, 2 s, 1 s, 0.5 s, 0.25 s, etc.), determine if the vehicle crosses more than one lane or exceeds the boundaries of the roadway (determined via GPS data and/or comparing GPS data to MAP data), compare the acceleration and heading readings to historical data corresponding to the particular roadway location (e.g., is the particular roadway location near a highway entrance and thus sudden changes in vehicle behavior is relatively common), etc. Accordingly, in various embodiments, each of these comparisons may be steps in a matching algorithm executing prediction models generated by machine learning.

Figure 2:
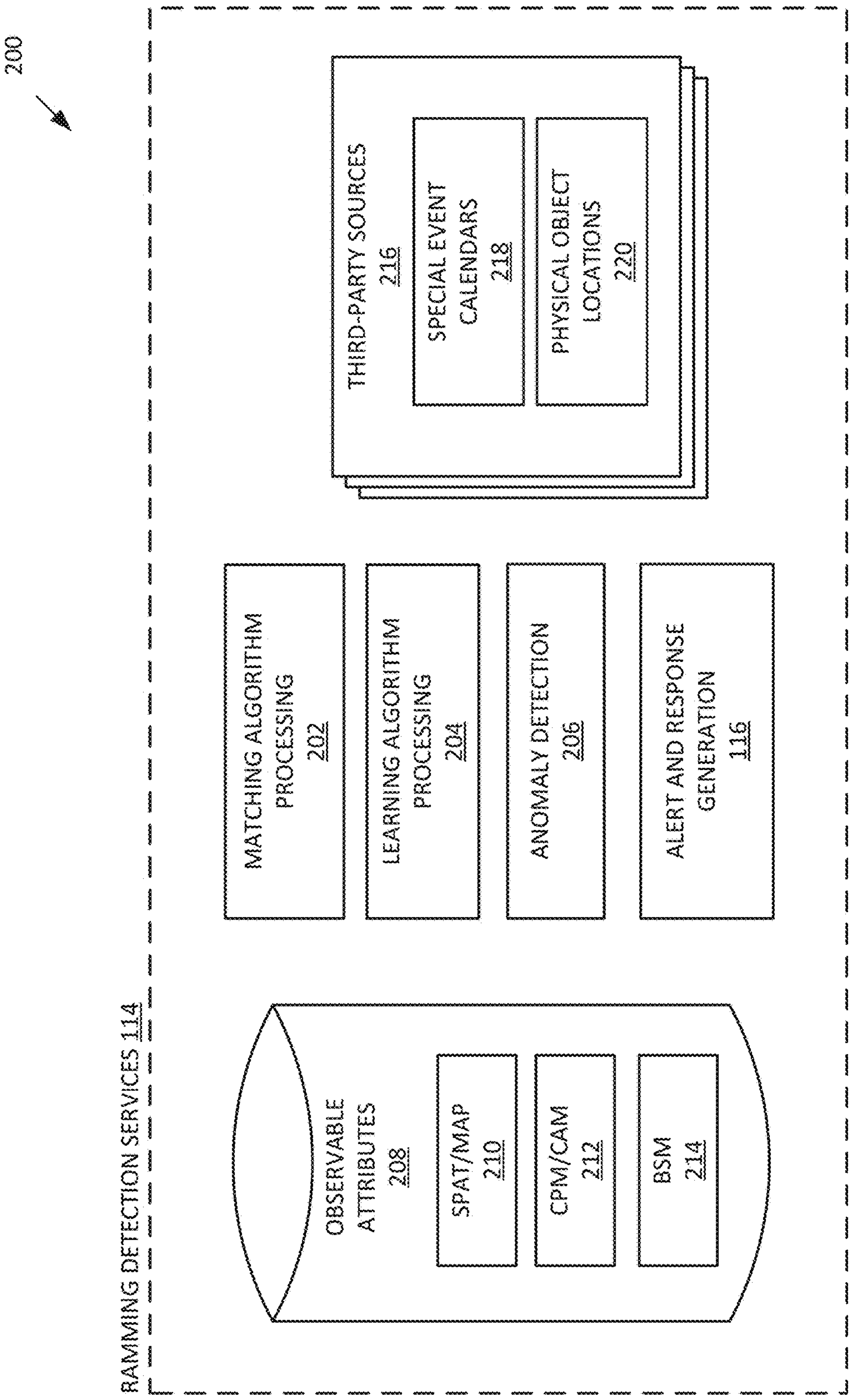
FIG. 2 is a diagram of an exemplary system architecture, according to one embodiment of the present disclosure.

Proceeding to FIG. 2, an exemplary system architecture 200 is shown, according to one aspect of the present disclosure. Specifically, FIG. 2 illustrates an exemplary architecture of the ramming detection services 114 discussed above in association with the description of FIG. 1. In one embodiment, the ramming detection services 114 may include one or more processors or processing systems/subsystems such as a matching algorithm processing system 202, a learning algorithm processing system 204, an anomaly detection system 206, the alert and response generation system 116 (discussed briefly above in association with the description of FIG. 1), etc. The ramming detection services 114 may furthermore include one or more databases, such as an observable attributes database 208. In various embodiments, the observable attributes database 208 may store the various data types detected or received from vehicles on a roadway, traffic intersection data received from intersection controller units, etc. For example, in particular embodiments, the observable attributes database may store SPaT/MAP data 210, CPM/CAM data 212, BSM data 214, and generally any other appropriate data. In various embodiments, the ramming detection services 114 may also include operative connections to third-party sources 216, such as special even calendars 218 (e.g., published by sporting arenas, concert halls, educational/school semesters and class schedules, etc.), and physical object locations 220 (e.g., coordinates retrievable via APIs from online map services, etc.).

Figure 3:
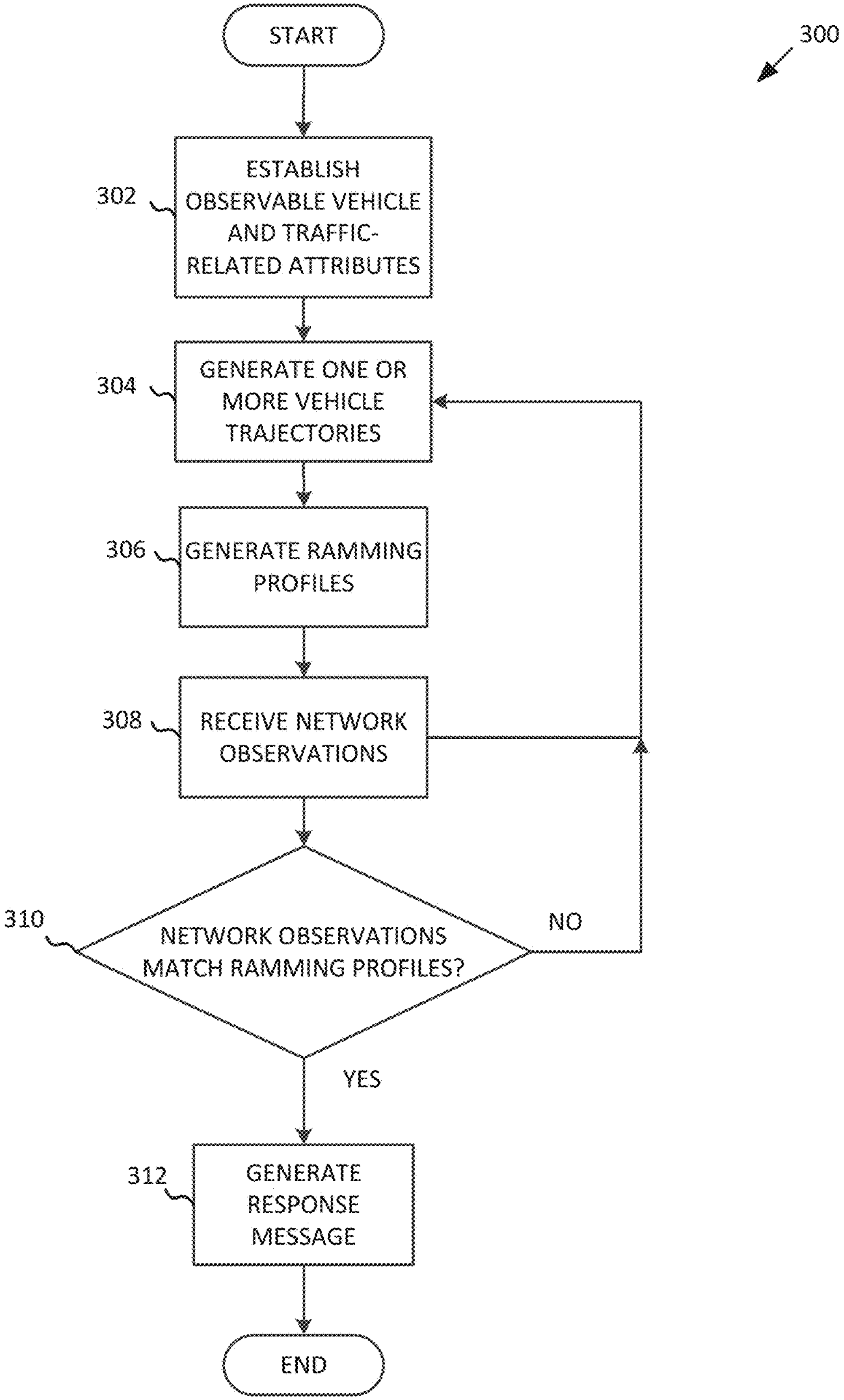
FIG. 3 is a flowchart of an exemplary system process, according to one embodiment of the present disclosure.

FIG. 3 is a flowchart of an exemplary system process 300, according to one aspect of the present disclosure. In various embodiments, the process 300 discusses a series of steps (not necessarily limited to being executed in a particular order) by which the system may identify and represent vehicles currently traveling on roadways, compare attributed received in BSMs from those vehicles to ramming profiles, and furthermore generating an alert or emergency response message (if the received attributes match with one or more ramming profiles and/or a ramming attack was otherwise detected).

In one embodiment, the process 300 begins at step 302, where the system establishes the observable vehicle and traffic-related object attributes. In various embodiments, generally any parameter included in messages transmitted over or the 5G-MEC network is observable. According to aspects of the present disclosure, observable vehicle and traffic-related object attributes may include any parameter identified in messages such as BSM's, CAM's, CPM's, MAP data, and SPaT data. In various embodiments, observable attributes in a BSM may include vehicle speed, heading, steering wheel angle, acceleration, yaw rate, longitude and latitude, etc.

In various embodiments, at step 304, the system generates one or more vehicle trajectories, or vehicular behavior profiles, based on the observed attributes from data included in received BSM's, CAM's, CPM's, and the like. In particular embodiments, BSM's correspond to individual vehicles and generally include travel-related data such as speed, heading/direction, acceleration, steering wheel angle, yaw rate, etc. In certain embodiments, and using attributes identified within one or more broadcasted and received BSM's, the system may generate a trajectory and traversal kinematics for vehicles based on their broadcasted BSM's. In some embodiments, the system may generate vehicle trajectories based on models generated by the learning algorithm processing system 204. In particular embodiments, trajectories are generated by vehicle on-board computing systems, and the trajectories (or metadata corresponding to the trajectories) are included in BSM transmissions.

According to various aspects of the present disclosure, at step 306, the system generates ramming profiles, or predicted abnormal/impermissible vehicular behavior profiles. In various embodiments, a ramming profile is generally a data object representative of a potential (or hypothetical) abnormal vehicle trajectory (e.g., 118*b*), which includes a combination of vehicular behavior attributes and other traffic-related attributes that deviate (in varying degrees) from a permissible and expected vehicle trajectory (e.g., trajectory 118*a*). For example, a ramming profile, or an impermissible predicted vehicular behavior profile, may include longitude and latitude data corresponding to a geographic location that is outside the boundaries of the roadway on which the vehicle is traveling. Moreover, the ramming profile may also include acceleration data that suggests the vehicle is not attempting to brake, despite the vehicle traveling outside the permissible roadway boundaries. In at least one embodiment, the system may generate ramming profiles based on models generated by the learning algorithm processing system 204. In particular embodiments, the system may generate ramming profiles based on BSM's emitted from vehicles on a roadway (such as the BSM's received for execution of step 304).

Proceeding now to step 308, the system receives network observations (e.g., updated BSM's), in at least one embodiment. According to various aspects of the present disclosure, the system may include a 5G-MEC network by which sensors and systems in vehicles, mobile phones, traffic controller units, and other appropriate systems, transmit or broadcast various types of data messages (e.g., BSM's, CAM's, CPM's, MAP data, SPaT data, etc.) which include observable traffic attributes. In various embodiments, the network observations received at step 308 may include updated versions of the vehicle BSM's received earlier for the execution of step 304.

At step 310, the system determines if the network observations (or the vehicular behavior profiles and trajectories generated based on the network observations) match with at least one of the generated ramming profiles. If it is determined that the observed network attributes do not match with one or more ramming profiles, the system may return to step 304, where the system continues to generate, update, or refine vehicle trajectories based on the network observations received at step 308. However, if it is determined at step 310 that the network observations match (at least within a predetermined threshold) with attributes of one or more ramming profiles, the process 300 may continue to step 312. According to various aspects of the present disclosure, a match between a ramming profile and a vehicular behavior profile (based on the observed network attributes) may indicate a vehicular ramming attack for which emergency response is needed.

In various embodiments, at step 312, the system may generate and perform a particular response based on the network observations and matching ramming profile(s) from step 310. In one embodiment, at step 312, the system may generate an emergency response message or alert (e.g., an automatic 911 call, an alert to nearby hospitals, etc.). According to various aspects of the present disclosure, the alert or response message may include metadata corresponding to the attributes common between the matched network observations and ramming profile(s) from step 310. In at least one embodiment, the system may automatically generate emergency response alerts or messages via a URLLC and O-RAN implementation.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multiprocessor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence (s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein.

What is claimed is:

1. A method comprising the steps of:

receiving, at a wireless network edge computing device comprising a processor and memory, a first transport data message broadcasted in real-time from a controller device at a vehicle traveling on a roadway, wherein the first transport data message comprises data elements corresponding to a first transport state of the vehicle;

processing preidentified data elements from the first transport data message, the preidentified data elements comprising measurements corresponding to the first transport state of the vehicle, wherein processing the preidentified data elements comprises determining the vehicle's geographical location and generating a first vehicular behavior profile indicative of the vehicle's expected trajectory, the first vehicular behavior profile comprising a computer-generated digital representation of an expected location and an expected speed of the vehicle extrapolated from the preidentified data elements from the first transport data message;

in response to determining the vehicle's geographical location, comparing the vehicle's geographical location to roadway location and geometry data stored in the memory to determine the roadway on which the vehicle is traveling and the roadway's physical geometric characteristics;

generating, via a trained data model running at the processor, a plurality of hypothetical vehicular behavior profiles wherein each of the plurality of hypothetical vehicular behavior profiles corresponds to permissible or impermissible potential travel trajectories based on potential future variations of the first vehicular behavior profile with respect to the roadway on which the vehicle is traveling and the roadway's physical geometric characteristics, wherein each of the plurality of hypothetical vehicular behavior profiles comprises a computer-generated digital representation of a hypothetical location and hypothetical speed of the vehicle and at least one of the impermissible potential travel trajectories comprises a predicted future trajectory of the vehicle exceeding a boundary of the roadway;

receiving a second transport data message broadcasted in real-time from the controller device at the vehicle traveling on the roadway, wherein the second transport data message is broadcasted at a moment in time later than the first transport data message and comprises updated data elements corresponding to a second transport state of the vehicle;

processing updated preidentified data elements from the second transport data message, wherein processing the updated preidentified data elements comprises generating a second vehicular behavior profile indicative of an updated expected vehicle trajectory, the second vehicular behavior profile comprising a computer-generated digital representation of an updated expected location and an updated expected speed of the vehicle extrapolated from the preidentified data elements from the second transport data message;

comparing the second vehicular behavior profile to the plurality of hypothetical vehicular behavior profiles to determine if the second vehicular behavior profile matches at least one impermissible potential travel trajectory;

determining that a crowd of people is present in a path of the at least one impermissible potential travel trajectory based on querying an event calendar; and in response to determining a match between the second vehicular behavior profile and at least one impermissible potential travel trajectory and determining that the crowd is present along the at least one impermissible travel trajectory, executing one or more predetermined actions based on the match.

2. The method of claim 1, wherein the at least one impermissible potential travel trajectory comprises a variation in at least one of the vehicle measurements comprising speed, heading, steering wheel angle, acceleration, or yaw rate from the first vehicular behavior profile, and wherein the variation results in a hypothetical vehicular behavior profile representative of the updated expected vehicle trajectory exceeding the boundary of the roadway based on the roadway location and geometry data.

3. The method of claim 2, wherein the match between the second vehicular behavior profile and the at least one impermissible potential travel trajectory is indicative of the vehicle engaging in vehicular ramming behavior.

4. The method of claim 3, wherein executing the one or more predetermined actions based on the match comprises generating a notification corresponding to the match and transmitting the notification to the one or more third-party systems according to 5G-MEC network standards.

5. The method of claim 4, wherein the one or more third-party systems comprise systems associated with law enforcement and emergency response services.

6. The method of claim 1, wherein the trained data model generates the plurality of hypothetical vehicular behavior profiles based in part on third-party data comprising publicly available event calendars.

7. The method of claim 1, wherein the vehicle is an autonomous or semi-autonomous vehicle.

8. The method of claim 1, wherein prior to broadcasting the second transport data message, the controller device is operatively configured to receive and process at least one of the updated vehicle measurement data, sensory data corresponding to nearby detected objects, and behavior profiles transmitted from one or more nearby vehicles for generating the second transport state of the vehicle.

9. The method of claim 1, wherein executing the one or more predetermined actions based on the match comprises transmitting an emergency alert to one or more mobile devices in the crowd.

10. A system comprising:

a wireless network edge computing device comprising a processor and memory, wherein the processor is operatively configured to execute the steps comprising:

receiving, at the processor, a first transport data message broadcasted in real-time from a controller device at a vehicle traveling on a roadway, wherein the first transport data message comprises data elements corresponding to a first transport state of the vehicle;

processing preidentified data elements from the first transport data message, the preidentified data elements comprising measurements corresponding to the first transport state of the vehicle, wherein processing the preidentified data elements comprises determining the vehicle's geographical location and generating a first vehicular behavior profile indicative of the vehicle's expected trajectory, the first vehicular behavior profile comprising a computer-generated digital representation of an expected location and an expected speed of the vehicle extrapolated from the preidentified data elements from the first transport data message;

in response to determining the vehicle's geographical location, comparing the vehicle's geographical location to roadway location and geometry data stored in the memory to determine the roadway on which the vehicle is traveling and the roadway's physical geometric characteristics;

generating, via a trained data model running at the processor, a plurality of hypothetical vehicular behavior profiles wherein each of the plurality of hypothetical vehicular behavior profiles corresponds to permissible or impermissible potential travel trajectories based on potential future variations of the first vehicular behavior profile with respect to the roadway on which the vehicle is traveling and the roadway's physical geometric characteristics, wherein each of the plurality of hypothetical vehicular behavior profiles comprises a computer-generated digital representation of a hypothetical location and hypothetical speed of the vehicle and at least one of the impermissible potential travel trajectories comprises a predicted future trajectory of the vehicle exceeding a boundary of the roadway;

receiving a second transport data message broadcasted in real-time from the controller device at the vehicle traveling on the roadway, wherein the second transport data message is broadcasted at a moment in time later than the first transport data message and comprises updated data elements corresponding to a second transport state of the vehicle;

processing updated preidentified data elements from the second transport data message, wherein processing the updated preidentified data elements comprises generating a second vehicular behavior profile indicative of an updated expected vehicle trajectory, the second vehicular behavior profile comprising a computer-generated digital representation of an updated expected location and an updated expected speed of the vehicle extrapolated from the preidentified data elements from the second transport data message;

comparing the second vehicular behavior profile to the plurality of hypothetical vehicular behavior profiles to determine if the second vehicular behavior profile matches at least one impermissible potential travel trajectory;

determining that a crowd of people is present in a path of the at least one impermissible potential travel trajectory based on querying an event calendar; and in response to determining a match between the second vehicular behavior profile and at least one impermissible potential travel trajectory and determining that the crowd is present along the at least one impermissible travel trajectory, executing one or more predetermined actions based on the match.

11. The system of claim 10, wherein the at least one impermissible potential travel trajectory comprises a variation in at least one of the vehicle measurements comprising speed, heading, steering wheel angle, acceleration, or yaw rate from the first vehicular behavior profile, and wherein the variation results in a hypothetical vehicular behavior profile representative of the updated expected vehicle trajectory exceeding the boundary of the roadway based on the roadway location and geometry data.

12. The system of claim 11, wherein the match between the second vehicular behavior profile and the at least one impermissible potential travel trajectory is indicative of the vehicle engaging in vehicular ramming behavior.

13. The system of claim 12, wherein executing the one or more predetermined actions based on the match comprises generating a notification corresponding to the match and transmitting the notification to the one or more third-party systems according to 5G-MEC network standards.

14. The system of claim 13, wherein the one or more third-party systems comprise systems associated with law enforcement and emergency response services.

15. The system of claim 10, wherein the trained data model generates the plurality of hypothetical vehicular behavior profiles based in part on third-party data comprising publicly available event calendars.

16. The system of claim 10, wherein the vehicle is an autonomous or semi-autonomous vehicle.

17. The system of claim 10, wherein prior to broadcasting the second transport data message, the controller is operatively configured to receive and process at least one of the updated vehicle measurement data, sensory data corresponding to nearby detected objects, and behavior profiles transmitted from one or more nearby vehicles for generating the second transport state of the vehicle.

18. A tangible, non-transitory, computer-readable medium comprising instructions encoded therein, wherein the instructions, when executed by one or more processors, cause the one or more processors to execute the steps comprising:

receiving, at a wireless network edge computing device comprising the one or more processors and a memory, a first transport data message broadcasted in real-time from a controller device at a vehicle traveling on a roadway, wherein the first transport data message comprises data elements corresponding to a first transport state of the vehicle;

processing preidentified data elements from the first transport data message, the preidentified data elements comprising measurements corresponding to the first transport state of the vehicle, wherein processing the preidentified data elements comprises determining the vehicle's geographical location and generating a first vehicular behavior profile indicative of the vehicle's expected trajectory, the first vehicular behavior profile comprising a computer-generated digital representation of an expected location and an expected speed of the vehicle extrapolated from the preidentified data elements from the first transport data message;

in response to determining the vehicle's geographical location, comparing the vehicle's geographical location to roadway location and geometry data stored in the memory to determine the roadway on which the vehicle is traveling and the roadway's physical geometric characteristics;

generating, via a trained data model running at the one or more processors, a plurality of hypothetical vehicular behavior profiles wherein each of the plurality of hypothetical vehicular behavior profiles corresponds to permissible or impermissible potential travel trajectories based on potential future variations of the first vehicular behavior profile with respect to the roadway on which the vehicle is traveling and the roadway's physical geometric characteristics, wherein each of the plurality of hypothetical vehicular behavior profiles comprises a computer-generated digital representation of a hypothetical location and hypothetical speed of the vehicle and at least one of the impermissible potential travel trajectories comprises a predicted future trajectory of the vehicle exceeding a boundary of the roadway;

receiving a second transport data message broadcasted in real-time from the controller device at the vehicle traveling on the roadway, wherein the second transport data message is broadcasted at a moment in time later than the first transport data message and comprises updated data elements corresponding to a second transport state of the vehicle;

processing updated preidentified data elements from the second transport data message, wherein processing the updated preidentified data elements comprises generating a second vehicular behavior profile indicative of an updated expected vehicle trajectory, the second vehicular behavior profile comprising a computer-generated digital representation of an updated expected location and an updated expected speed of the vehicle extrapolated from the preidentified data elements from the second transport data message;

comparing the second vehicular behavior profile to the plurality of hypothetical vehicular behavior profiles to determine if the second vehicular behavior profile matches at least one impermissible potential travel trajectory;

determining that a crowd of people is present in a path of the at least one impermissible potential travel trajectory based on querying an event calendar; and in response to determining a match between the second vehicular behavior profile and at least one impermissible potential travel trajectory and determining that the crowd is present along the at least one impermissible travel trajectory, executing one or more predetermined actions based on the match.

19. The tangible, non-transitory, computer-readable medium of claim 18, wherein the at least one impermissible potential travel trajectory comprises a variation in at least one of the vehicle measurements comprising speed, heading, steering wheel angle, acceleration, or yaw rate from the first vehicular behavior profile, and wherein the variation results in a hypothetical vehicular behavior profile representative of the updated expected vehicle trajectory exceeding the boundary of the roadway based on the roadway location and geometry data.

20. The tangible, non-transitory, computer-readable medium of claim 19, wherein the match between the second vehicular behavior profile and the at least one impermissible potential travel trajectory is indicative of the vehicle engaging in vehicular ramming behavior.

* * * * *